(12) United States Patent
Mazzon et al.

(10) Patent No.: US 12,486,155 B2
(45) Date of Patent: Dec. 2, 2025

(54) PLANT FOR BOTTLING CONTAINERS WITH LIQUIDS AND METHOD FOR OPERATING SAID PLANT

(71) Applicant: GRUPPO BERTOLASO S.P.A., Zimella (IT)

(72) Inventors: Giovanni Mazzon, Lobia di San Bonifacio (IT); Diego Zecchinato, Sossano (IT); Walter Berto, Montagnana (IT)

(73) Assignee: GRUPPO BERTOLASO S.P.A., Zimella (IT)

( * ) Notice: Subject to any disclaimer, the term of this patent is extended or adjusted under 35 U.S.C. 154(b) by 0 days.

(21) Appl. No.: 18/379,252

(22) Filed: Oct. 12, 2023

(65) Prior Publication Data

US 2024/0124287 A1 Apr. 18, 2024

(51) Int. Cl.
*B65G 47/51* (2006.01)
*B67C 7/00* (2006.01)

(52) U.S. Cl.
CPC ............ *B67C 7/002* (2013.01); *B67C 7/0013* (2013.01); *B67C 7/0026* (2013.01); *B67C 7/004* (2013.01)

(58) Field of Classification Search
CPC ...... B65G 47/5131; B65G 2201/00244; B67C 7/002
USPC .......... 53/249, 250; 198/347.1, 459.2, 459.3, 198/557, 579
See application file for complete search history.

(56) References Cited

U.S. PATENT DOCUMENTS

| | | | | |
|---|---|---|---|---|
| 5,996,322 A | * | 12/1999 | La Barre | B67C 7/002 425/526 |
| 6,152,291 A | * | 11/2000 | Steeber | B65G 47/5131 198/594 |
| 8,028,815 B2 | * | 10/2011 | Hahn | B65G 47/5113 198/347.1 |

FOREIGN PATENT DOCUMENTS

| | | | | |
|---|---|---|---|---|
| IT | PD2012U000046 | | 12/2013 | |
| IT | 201800003763 A1 | * | 9/2019 | B65G 47/51 |

OTHER PUBLICATIONS

Italian Search Report for IT 2022200021231 Mailed on May 10, 2023.
European Search Report for EP 23203503 Mailed on Mar. 5, 2024.

* cited by examiner

*Primary Examiner* — Thanh K Truong
*Assistant Examiner* — Patrick B Fry
(74) *Attorney, Agent, or Firm* — Rivka Friedman

(57) ABSTRACT

Bottling plant comprising a first transport system which moves containers through different machines, and a storage apparatus, which comprises a storage unit, a second transport system which extracts the containers from the first transport system to feed the storage unit, and a third transport system which picks up the containers in the storage unit to feed the first transport system. The first transport system comprises an upstream conveyor actuated at a first operative speed, and a downstream conveyor actuated at a second operative speed. The plant further comprises a control unit programmed with: a by-pass mode, in which it commands the conveyors with equivalent operative speeds, a storage mode, in which it commands the conveyors with the first operative speed greater than the second operative speed, and a recovery mode, in which it commands the conveyors with (Continued)

the first operative speed lower than the second operative speed.

12 Claims, 5 Drawing Sheets

PLANT FOR BOTTLING CONTAINERS WITH LIQUIDS AND METHOD FOR OPERATING SAID PLANT

FIELD OF APPLICATION

The present invention refers to a plant for bottling containers with liquids as well as to a method for operating such plant.

The present plant is intended to be employed in semi-automated or automated manner in industrial field in order to fill containers, generally bottles, with liquids advantageously of food type (but also not exclusively food), such as for example wines, liquors, spirits, mineral water, fruit juices, etc., through a plurality of machines in line, each dedicated to respective operations of the bottling process of the plant. Such machines are in particular aimed to depalletize the containers, rinse them, fill them, cap them in the pre-established modes such as for example by means of tapping/corking with corks, screw caps or with capsules, labeling them and hence preferably also inserting them in cardboard packages.

The present plant is advantageously employable for attaining an industrial bottling line, in particular for bottling wines and hard liquors, with high productivity.

STATE OF THE ART

As is known, a modern bottling plant, in particular for bottling food products such as wine, generally comprises a machine for depalletizing the containers, i.e. adapted to pick up the containers from the pallets, setting them on a transport line, a rinsing machine, adapted to wash or even sterilize the containers, a filler machine in order to transfer a food liquid from a tank to the containers, a capping machine for hermetically closing each container, e.g. with a cork, a labeling machine for fixing a suitable label on each container and finally a packaging machine for positioning a group of bottles in a cardboard package.

The abovementioned machines are generally, and in particular in the case of high productions, of rotary carousel type, i.e. of the type peripherally carrying a plurality of operating heads mounted thereon. Depending on the machine considered, the operating heads can for example be: rinsing heads, filler heads, capping heads, roller heads, labeling heads or still other operating heads.

The aforesaid carousel machines with rotary carousel are connected in a single production line by means of transport systems associated with the rotary machines and generally comprising belts, screws and star carrier apparatus. Such transport systems are advantageously synchronized with the same rotary machines, such that the position of each container exactly corresponds with the position of the operating member of the machine, for example constituted by grippers or by simple support plates. In order to obtain this result, the cells or the grippers of the star carriers and the other transport and guide elements have shape and size for being associated with the corresponding containers.

Companies in the beverage field, in particular in wine-making, increasingly require high productivity of the bottling line and hence it is necessary to limit production stop times as much as possible, such stops due for example to problems in one of the machines of the line, to failures, to size changes or even just to ordinary maintenance, i.e. only a simple intervention on an operating machine.

It can happen that a bottle is broken in the initial rinsing step at the rinsing machine, or in one of the final steps of the line, for example in the capping step at a capping machine, e.g. with corks, or even that a bottle explodes during bottling in particular if the line provides for a bottling with isobaric machine for sparkling liquids such as for example sparkling wines.

Since all the machines are interconnected with each other by common transport systems, such as for example conveyor belts, screws and star carriers, which are arranged for transporting the containers between one machine of the plant and the next, a problem in one of the machines would translate into a simultaneous stop of the entire line, since the containers transported by the transport systems could no longer pass through the machine that encountered the problem.

In order to overcome this considerable drawback, it is known to use apparatuses for the storage of containers (generally known in the technical jargon of the field with the term of pulmonators), which are employed in the field of industrial bottling plants for temporarily storing the containers in case of a momentary interruption or of a slow-down of one of the machines associated with the line, for example following a failure, or as specified above following the breakage of a container.

Examples of apparatuses for the storage of containers are described in the patent IT PD2012U000046 in the name of the same applicant.

In general, the apparatuses for the storage of containers employed in industrial bottling plants usually comprise a support structure, on which two parallel conveyor belts are mounted, advantageously obtained with belts hinged one after the other, together defining a storage unit formed by two separate coplanar planes that are side-by-side each other.

The aforesaid two belts are wound as a ring on at least two pulleys and are actuated to be moved in a parallel manner but in opposite directions.

An inlet belt of the two belts receives the containers from a conveyor placed upstream of the apparatus in order to store the containers on the apparatus, while an outlet belt of the two belts sends the containers to a downstream conveyor of the apparatus in order to unload the stored containers.

In addition, bottling plants are known on the market comprising a directing group, which is susceptible of sending the containers from the downstream conveyor to the storage apparatus and vice versa. In particular, the directing group is generally commanded by a logic control unit, which defines the operation thereof based on a command imparted by an operator, or based on the signal coming from sensors placed on each machine of the bottling plant itself.

More in detail, the directing groups of known type comprise a first star carrier, which intercepts the upstream conveyor and a second star carrier, which intercepts the downstream conveyor. In addition, the directing group comprises at least one third star carrier, which intercepts first star carrier, the second star carrier, the inlet belt and the outlet belt of the storage apparatus. In particular, the third star carrier is susceptible, based on the command imparted by the logic control unit, of being selectively fed by the first star carrier or by the outlet belt, and is susceptible of selectively feeding the inlet conveyor and the second star carrier.

For example, in the case of a failure in a downstream machine of the storage apparatus, the logic control unit commands the third star carrier to pick up the containers from the first star carrier and to feed the inlet belt, so as to store the containers themselves in the storage unit. Otherwise, in the case of failure in an upstream machine, the logic control unit commands the third star carrier to pick up the containers from the outlet belt and to deposit them on the downstream conveyor, in a manner such to feed the machines downstream of the storage apparatus with the containers previously stored on the storage unit. If however there is no failure, the logic control unit commands the third star carrier to pick up the containers from the first star carrier and to transfer them to the third star carrier, without making them transit through the storage unit.

The bottling plants of the above-described type have in practice shown that they do not lack drawbacks.

The main drawback of such plants lies in the fact that do not ensure a sufficient operating flexibility and a high efficiency. Indeed, with the plants of known type, in order to store containers on the storage unit, it is necessary to stop the production of the operating machines by the downstream plant of the storage apparatus. In addition, it is not possible to recover a possible storage of containers in the storage apparatus, e.g. due to a momentary stop of the machines downstream for ordinary maintenance or failure, without simultaneously stopping the operating machines by the upstream plant of the storage apparatus.

In particular, the stoppage of the production of one part of the plant translates into an increase of the overall processing times and consequently in an increase of the operating costs.

An example of a bottling plant of this type is described in the patent application IT 102018000003763.

PRESENTATION OF THE INVENTION

In this situation, the problem underlying the present invention is to overcome the drawbacks manifested by the art known up to now, by providing a plant for bottling containers with liquids as well as a method for operating such plant, which are able to ensure the storage of containers in a section of the line, simultaneously maintaining operative the machines upstream and the machines downstream with respect to such section, where the storage of containers occurs.

Further object of the present invention is to provide a plant for bottling containers with liquids as well as a method for operating such plant, which are capable of ensuring the recovery of the containers stored in a section of the line, simultaneously maintaining operative the machines upstream and the machines downstream with respect to such section in which the storage of containers occurs.

Further object of the present invention is to provide a plant for bottling containers with liquids as well as a method for operating such plant, which ensure an improved productivity.

Further object of the present invention is to provide a plant for bottling containers with liquids as well as a method for operating such plant, which allow maintaining a high automation.

Further object of the present invention is to provide a plant for bottling containers with liquids that is structurally simple and entirely reliable in operation.

BRIEF DESCRIPTION OF THE DRAWINGS

The technical characteristics of the invention, according to the aforesaid objects, and the advantages thereof, will be more evident in the following detailed description, made with reference to the enclosed drawings, which represent a merely exemplifying and non-limiting embodiment of the invention, in which.

DETAILED DESCRIPTION OF A PREFERRED EMBODIMENT

Figure 1:
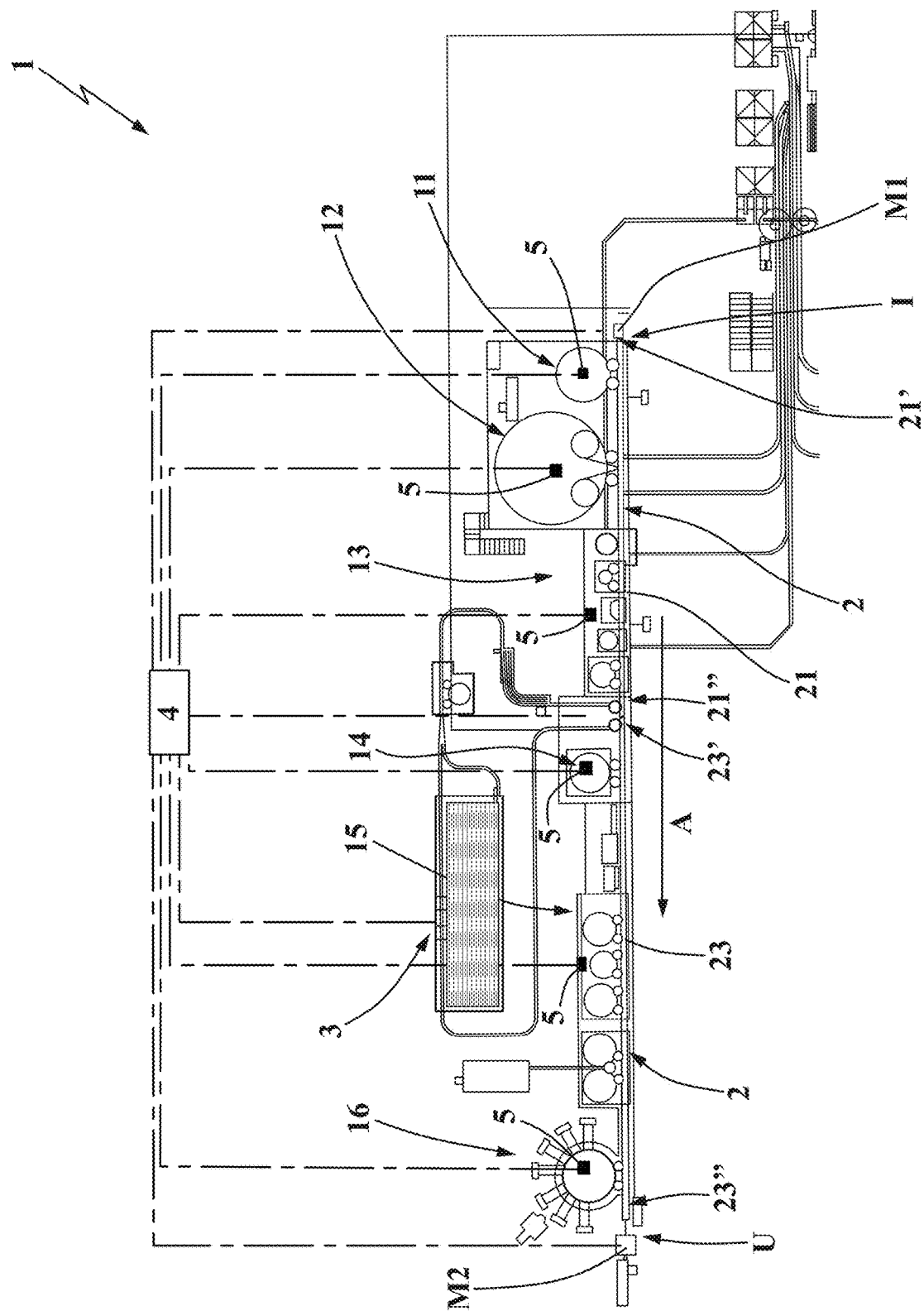
FIG. 1 shows a plan view of the plant for bottling containers with liquids, object of the present finding.
Figure 2:
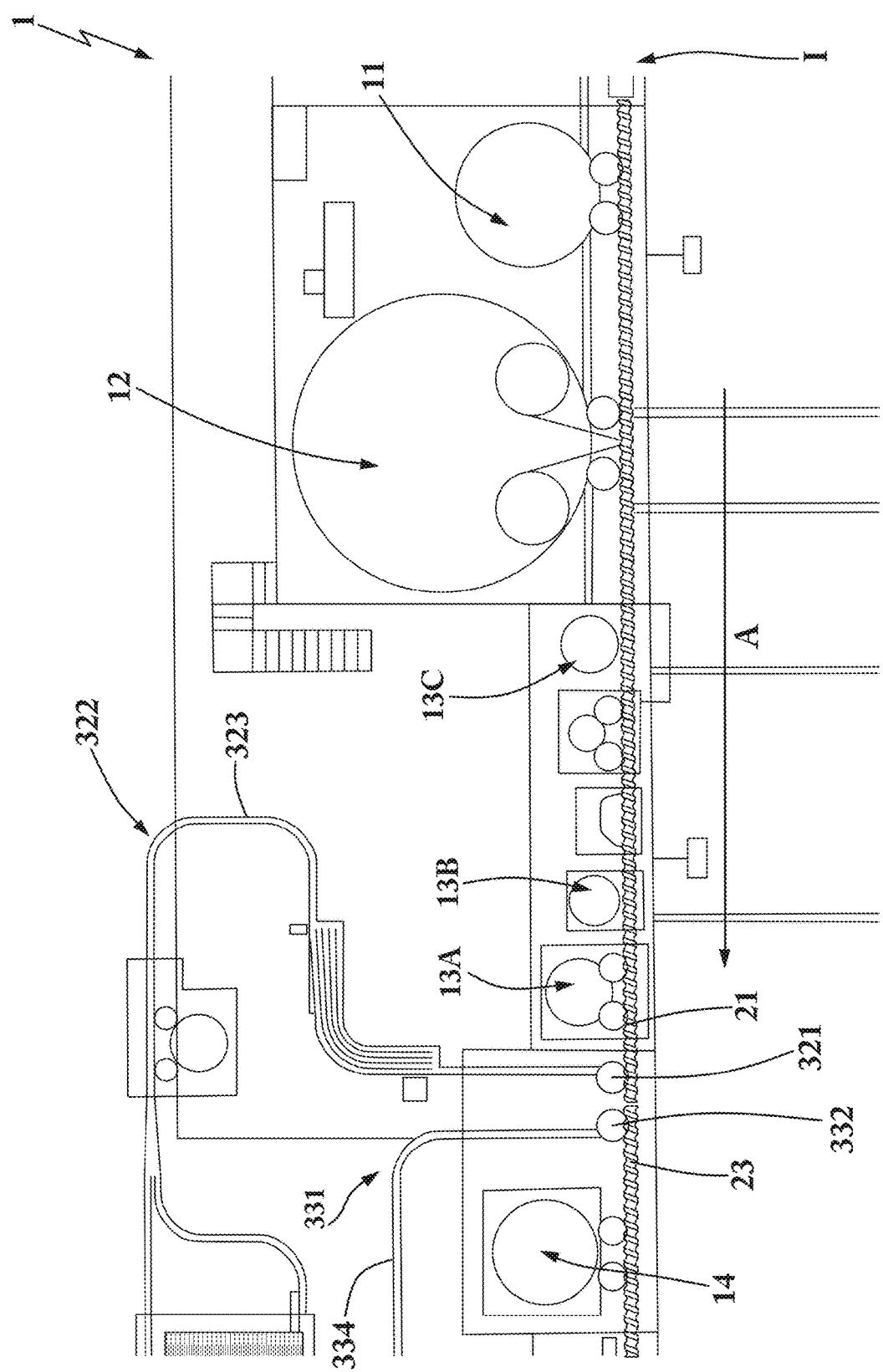
FIG. 2 shows an enlarged view of a wet section of the bottling plant of FIG. 1.
Figure 3:
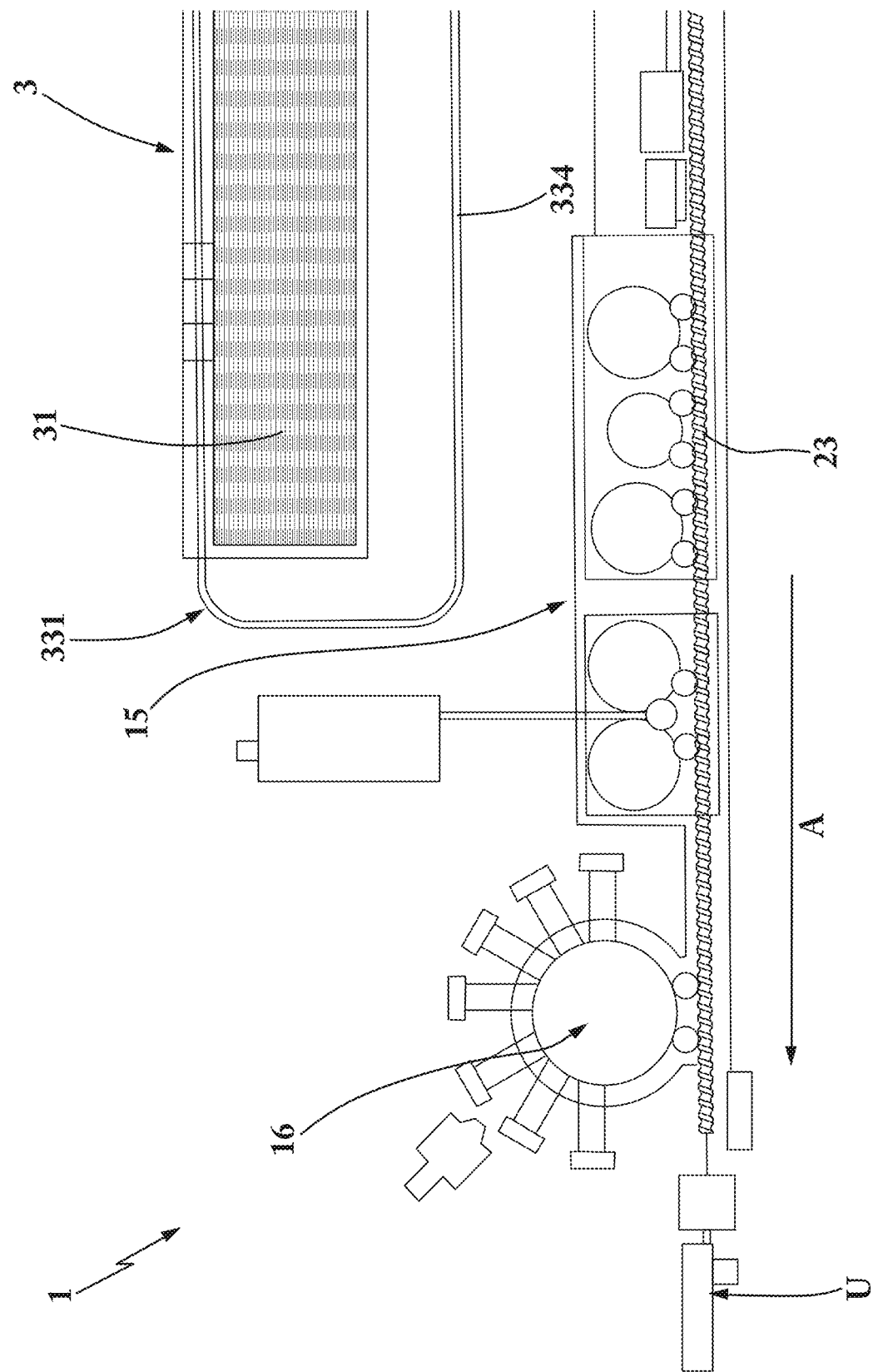
FIG. 3 shows an enlarged view of a dry section of the bottling plant of FIG. 1.
Figure 4:
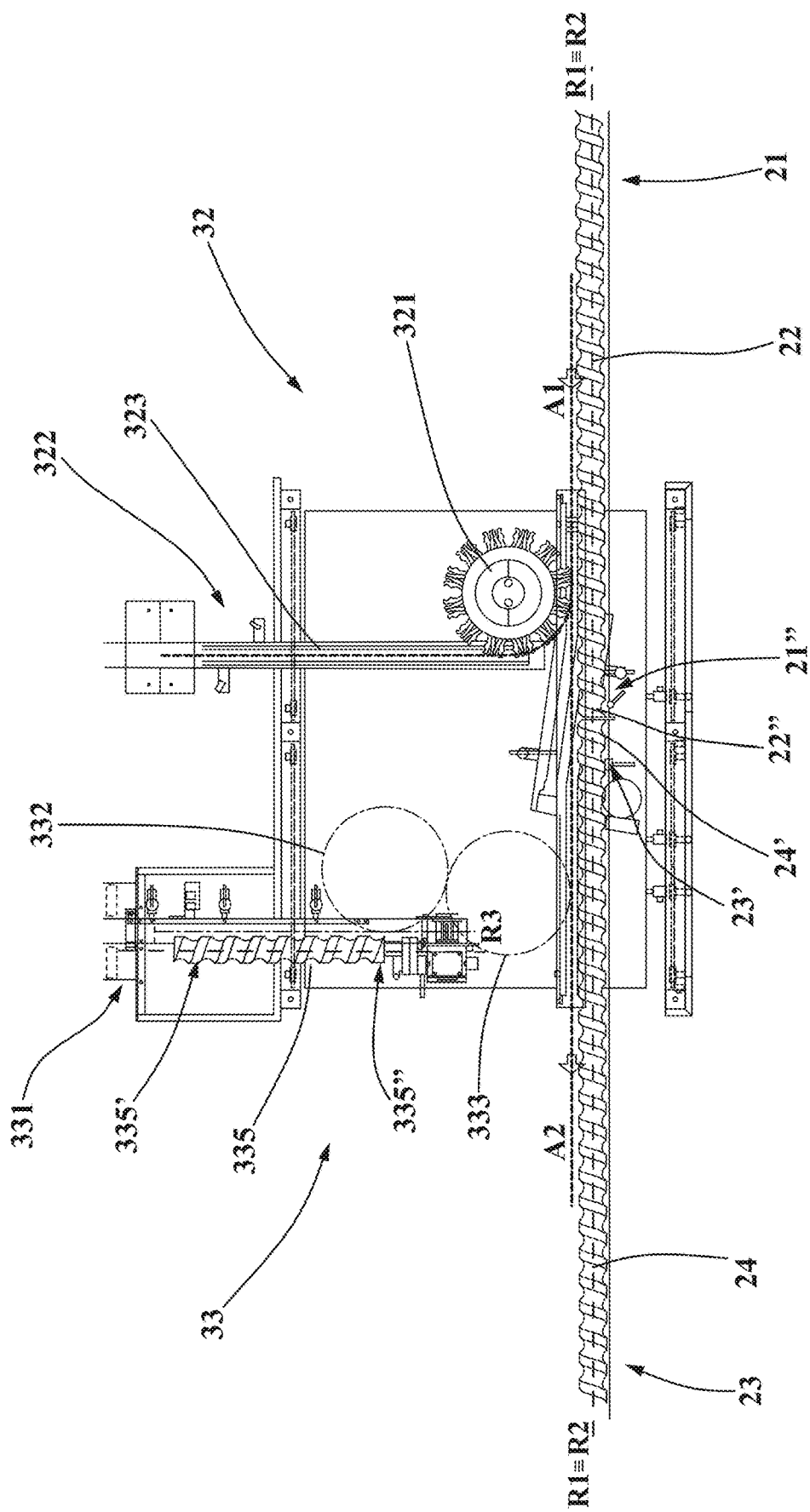
FIG. 4 shows an enlarged view of a second transport system and a third transport system in a by-pass mode in which the trajectory followed by the containers is indicated with thick dashed line.
Figure 5:
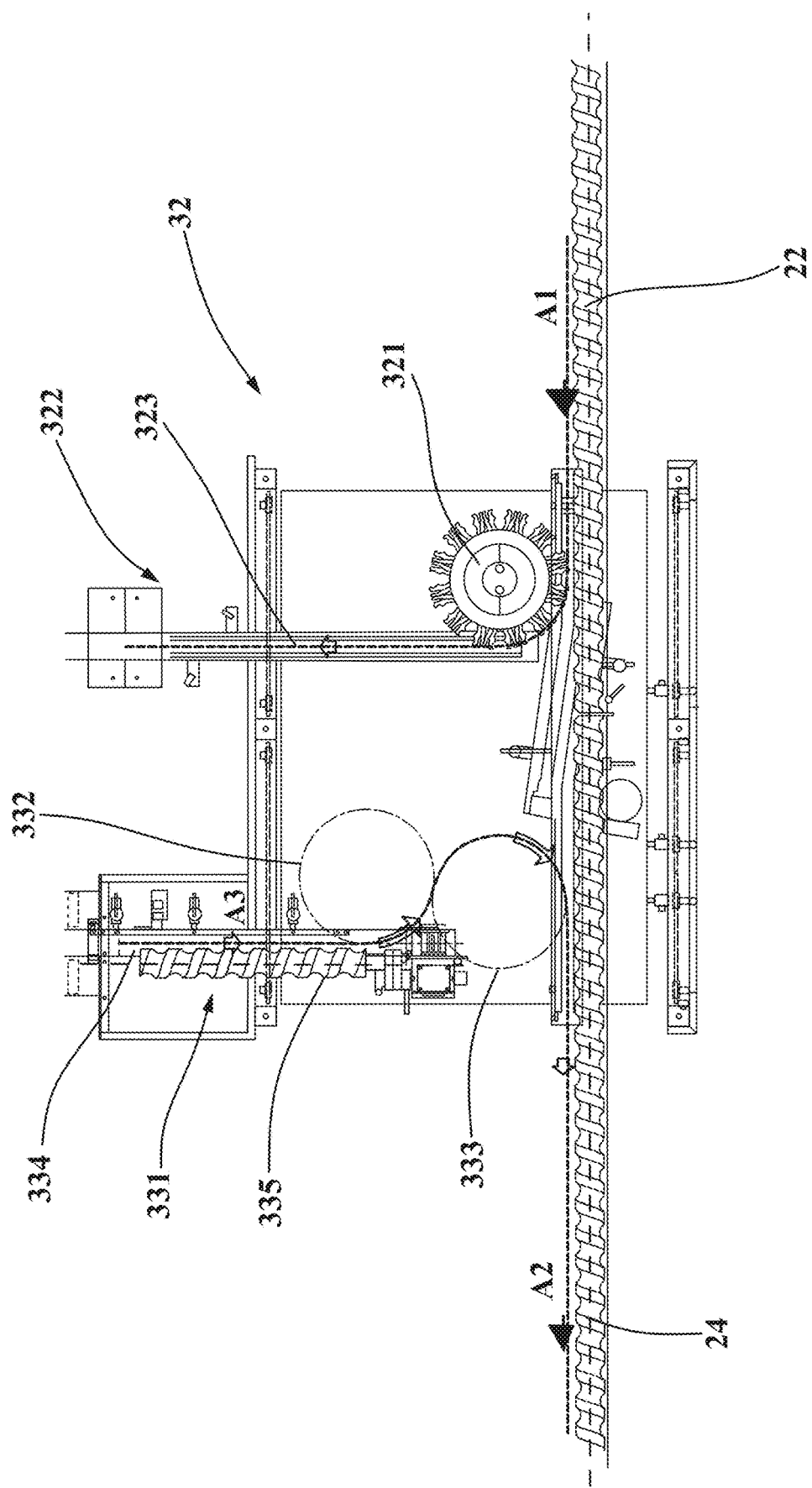
FIG. 5 shows an enlarged view of the second transport system and the third transport system in a storage mode or recovery mode in which the trajectory followed by the containers is indicated with thick dashed line.

With reference to the enclosed drawings, reference number 1 overall indicates an embodiment of a plant for bottling containers with liquids, object of the present invention.

The present plant 1 for bottling is advantageously intended to be employed in winemaking for the bottling of containers, usually bottles, with wine or hard liquors; of course, without departing from the protective scope of the present patent, the present plant 1 can be employed for packaging any one other liquid in containers, even non-food liquid.

The containers employed can of course have any size, e.g. conventional bottle shape, or with the bottle body with parallelepiped or conical shape, or with still other shapes. In accordance with the example enclosed in the enclosed figures the bottling plant 1 comprises a plurality of operating machines one after the other along a bottling line indicated with the arrow A, whose direction indicates the advancing direction of the containers along the line.

Such plurality of machines of the bottling line A advantageously consists of at least one rinsing machine 11, one filler machine 12 and one capping machine 13. More in detail, the capping machine 13 can be composed of different groups selectively operating as a function of the cap type that one wishes to apply. For example, the capping machine can provide for a capping with corks 13A, a capping with crown caps 13B and a capping with screw caps 13C.

In accordance with the embodiment illustrated in the enclosed figures the plant 1 comprises, in addition, an inspection machine 14 for verifying the fill level and/or the seal of the bottles and/or the position of the cap, a cap-sealing machine 15 and a labeling machine 16.

The aforesaid operating machines 11-16 of the bottling line A are connected to each other by means of a first transport system 2, which is adapted to move the containers (not illustrated), in particular bottles, along the bottling line A from an inlet section I of the plant 1 to an outlet section U of the plant 1.

More in detail, in the advancement direction of the bottling line A, after the inlet section I of the first transport system 2, one encounters the rinsing machine 11 which washes or even sanitizes the containers, the filler machine 12 which fills the containers with the desired liquid level, the capping machine 13 which proceeds to close the mouth of the containers, the inspection machine 14 which proceeds to carry out verifications on the correctness of the operations carried out by the above-indicated operating machines placed upstream in that which in the technical jargon of the field is termed "wet" section of the plant 1.

Downstream of the inspection machine 14, the following are also advantageously present, in a section that is usually identified as "dry" in the technical jargon of the field: a cap-sealing machine 15 for covering the head of the bottles with capsules of the desired material, and a labeling machine 16 for applying the labels on the external surface of the containers before the outlet section U of the plant 1.

Of course, also other machines can be provided for within the bottling line A without departing from the protective scope of the present patent.

The abovementioned machines are generally, and in particular in the case of high productions, of rotary carousel type, i.e. of the type carrying a plurality of operating heads peripherally mounted thereon. Depending on the machine considered, the operating heads can for example be: rinsing heads, filling heads, capping heads, cap-sealing heads, rolling heads, labeling heads or still other operating heads.

In particular, the aforesaid machines with rotary carousel are connected in the single abovementioned bottling line A by means of the first transport system 2 associated with the rotary machines.

The plant 1, object of the present invention, also comprises at least one storage apparatus for storing a plurality of containers, which was indicated with 3 in the enclosed figures. This is for example constituted by an apparatus commonly known in the technical jargon of the field with the term pulmonator.

Such storage apparatus 3 is associated with a section of the bottling line A interposed between at least one upstream machine of the plurality of machines, which hereinbelow as an example will be indicated with 13, i.e. with the reference number of the capping machine, and a downstream machine of the plurality of machines which hereinbelow as an example will be indicated with 15, i.e. with the reference number of the cap-sealing machine.

The aforesaid storage apparatus 3 comprises a storage unit 31 for the containers, a second transport system 32 which is susceptible of extracting the containers from the first transport system 2 of the bottling line A in order to feed the storage unit 31 and a third transport system 33, which is susceptible of picking up the containers stored on the storage unit 31 itself in order to feed the first transport system 2 of the bottling line A.

According to the embodiment represented in the enclosed figures, the storage unit 31 is advantageously constituted by a storage table, on which the containers are susceptible of being placed, which is fed by the second transport system 32 with containers coming from the first transport system 2, and from which the third transport system 33 is susceptible of picking up the containers in order to send them towards the second transport system 2.

Without departing from the protective scope of the present invention, the storage unit 31 can be constituted by any one device adapted to store containers, even different from a storage table, such as for example a spiral store.

Therefore with the expression "storage unit", it must be intended any one machine, such as for example a storage table or a spiral store, provided with the possibility to store containers.

The man skilled in the art knows perfectly well the characteristics of the different operating machines 11-16 mentioned above as well as of the storage apparatus 3 for the containers, which therefore will not be described in detail.

According to the idea underlying the present invention, the aforesaid first transport system 2 comprises at least one upstream conveyor 21 actuated by a first motor system M1 at a first operative speed V1, and at least one downstream conveyor 23, actuated by a second motor system M2 at a second operative speed V2.

Advantageously, by first and second operative speeds V1, V2 it is intended the speed at which the containers are moved along the bottling line A respectively by the upstream conveyor 21 and by the downstream conveyor 23.

According to the embodiment represented in the enclosed figures, the upstream conveyor 21 intercepts all the operating machines 11-13 placed upstream with respect to the storage apparatus 3, and the downstream conveyor 23 intercepts all the operating machines 14-16 placed downstream of the storage apparatus 3.

As is known, the quantity of containers per unit of time that are processed by such operating machines 11-16 is equal to quantities of containers per unit of time respectively transported by the upstream conveyor 21 and by the downstream conveyor 23.

In this situation, a variation of the first operative speed V1 of the upstream conveyor 21 is translated into a corresponding variation of the productivity of the operating machines upstream 11-13 with respect to the storage apparatus 3. In an entirely similar manner, a variation of the second operative speed V2 of the downstream conveyor 23 is translated into a corresponding variation of the productivity of the operating machines downstream 14-16 with respect to the storage apparatus 3.

More in detail, the upstream conveyor 21 is extended between a first end 21' and an opposite release end 21" and is placed upstream of the storage apparatus 3. In addition, the downstream conveyor 23 is advantageously extended between an inlet end 23' and an opposite second end 23" and is placed downstream of the storage apparatus 3. In particular, the release end 21" of the upstream conveyor 21 is side-by-side the inlet end 23' of the downstream conveyor 23, so as to transfer the containers from the upstream conveyor 21 to the downstream conveyor 23.

In particular, the release end 21" of the upstream conveyor 21 is adjacent to the inlet end 23' of the downstream conveyor 23, in a manner such that the downstream conveyor 23 is extended as a continuation of the upstream conveyor 21, in particular substantially without discontinuity with respect to the latter.

Preferably, the release end 21" and the inlet end 23' respectively of the upstream conveyor 21 and of the downstream conveyor 23 are placed on the bottling line A at the aforesaid storage apparatus 3.

Advantageously, the second transport system 32 is interposed between the upstream conveyor 21, in particular at its release end 21", and the storage unit 31 and intercepts the upstream conveyor 21 itself in order to transfer the containers moving on the latter towards the storage unit 31.

Preferably, the third transport system 33 is interposed between the storage unit 31 and the downstream conveyor 23, in particular at its inlet end 23', and intercepts the downstream conveyor 23 in order to transfer the containers from the storage unit 31 to the downstream conveyor 23 itself.

The bottling plant 1 comprises, in addition, a logic control unit 4, which is connected to the first and second motor systems M1, M2 of the respective downstream conveyor 21 and upstream conveyor 23 of the first transport system 2, to the second transport system 32 and to the third transport system 33.

Advantageously, since the logic control unit 4 is connected to the first and second motor systems M1, M2 in order to command them, this can manage the first and the second operative speeds V1, V2 respectively of the upstream conveyor 21 and of the downstream conveyor 23. More in detail, as shown above, the logic control unit 4, by managing the first and the second operative speeds V1, V2, consequently adjusts the quantity of containers respectively processed by the upstream operating machines 11-13 and by the downstream operating machines 14-16, and consequently adjusts the number of containers per unit of time that enter and exit from the storage apparatus 3 by means of the second and the third transport system 32, 33.

The aforesaid logic control unit 4 is programmed in accordance at least with a by-pass mode, a storage mode and a recovery mode.

In the aforesaid by-pass mode, the logic control unit 4 commands the first motor system M1 and the second motor system M2 with equivalent first and second operative speeds V1, V2 (respectively of the upstream conveyor 21 and of the downstream conveyor 23).

In particular, in this manner, the first operative speed V1 of the upstream conveyor 21 is equal to the second operative speed V2 of the downstream conveyor 23.

In addition, in such operating modes, the logic control unit 4 commands the second transport system 32 to not intercept the containers that are transported by the upstream conveyor 21. In this manner, the containers transit from the release end 21" of the upstream conveyor 21 to the inlet end 23' of the downstream conveyor 23 in order to continue along the bottling line A.

Advantageously, in the aforesaid by-pass mode, the logic control unit 4 synchronizes the upstream conveyor 21 and the downstream conveyor 23, in a manner such to allow the passage of the containers between the conveyors 21, 23 themselves in a direct manner, in particular without them sustaining stresses that could lead to a damage thereof.

More in detail, in the event in which, for various production needs, it is not requested to use the storage apparatus 3, with the logic control unit 4 configured to operate according to the by-pass mode, the containers transit directly from the upstream conveyor 21 to the downstream conveyor 23, without any type of interaction with the first and second transport systems 32, 33 of the storage apparatus 3 itself. In this manner, with respect to the plants of known type, the fact that in such operating modes the containers do not interact with the second and the third transport systems 32, 33 involves a considerable reduction of the risk of damage of the containers themselves in the passage from one transport system to the other.

In the aforesaid storage mode, the logic control unit 4 commands the first motor system M1 and the second motor system M2 respectively with the first operative speed V1 greater than the second operative speed V2.

In particular, in this manner, the first operative speed V1 of the upstream conveyor 21 is greater than the second operative speed V2 of the downstream conveyor 23.

In addition, in such operating modes, the logic control unit 4 commands the second transport system 32 to extract the containers from the first transport system 2, and in particular from the upstream conveyor 21, in order to feed the storage unit 31 with the aforesaid containers.

Advantageously, in the storage mode, the logic control unit 4 can command the third transport system 33 to pick up the containers from the storage unit 31 and to feed the downstream conveyor 23 with these. In this manner, it is possible to maintain active the operating machines placed along the bottling line A downstream of the storage apparatus 3, simultaneously storing containers on the storage unit 31. In particular, the storage of containers on the storage unit 31 can be used in a subsequent step of the production which provides for a production slow-down of the operating machines placed upstream of the storage apparatus 3.

In the aforesaid recovery mode, the logic control unit 4 commands the first motor system M1 and the second motor system M2 respectively with the first operative speed V1 lower than the second operative speed V2.

In particular, in this manner, the second operative speed V2 of the downstream conveyor 23 is greater than the first operative speed V1 of the upstream conveyor 21. In addition, in such operating modes, the logic control unit 4 commands the third transport system 33 to pick up the containers stored on the storage unit 31 in order to feed the downstream conveyor 23.

Advantageously, in the recovery mode, the logic control unit 4 can command the second transport system 32 to pick up the containers from the upstream conveyor 21 and to feed the storage unit 31 with these. In this manner, it is possible to maintain active the operating machines placed along the bottling line A upstream of the storage apparatus 3, simultaneously reducing the quantity of containers stored beforehand on the storage unit 31, in order to restore the standard operations conditions of the bottling plant 1.

Advantageously, in the aforesaid storage and recovery modes, the first operative speed V1 and the second operative speed V2 are non-zero.

Preferably, the logic control unit 4 is programmed with a storage-only mode, in which it commands the second motor system M2 to stop the downstream conveyor 23 (i.e. by placing the second operative speed V2 at zero value) and commands the first motor system M1 to actuate the upstream conveyor 21 with the desired first operative speed V1 (non-zero).

Preferably, the logic control unit 4 is programmed with a recovery-only mode, in which it commands the first motor system M1 to stop the upstream conveyor 21 (i.e. by placing the first operative speed V1 at zero value) and commands the second motor system M2 to actuate the downstream conveyor 23 with the desired second operative speed V2 (non-zero).

Advantageously, the logic control unit 4 is connected to each of the operating machines 11-16 of the plant 1. In particular, the logic control unit 4 commands the operating machines 11-16 in a manner such to adjust the productivity thereof, intended as number of containers processed per unit of time, in a manner such to maintain the synchronization between the operating machines 11-16 themselves and the first transport system 2 of the plant 1.

Advantageously, the logic control unit 4 is programmed in accordance with a transit mode, in which it commands the first motor system M1 and the second motor system M2 with equivalent first and second operative speeds V1, V2. In addition, in such transit mode, the logic control unit 4 commands the second transport system 32 to extract the containers from the upstream conveyor 21 in order to feed the storage unit 31 and commands the third transport system 33 to pick up the containers stored on the storage unit 31 in order to feed the downstream conveyor 23.

In particular, since the first operative speed V1 and the second operative speed V2 are equivalent to each other, in such transit mode advantageously the number of containers per unit of time that are deposited on the storage unit 31 is equal to the number of containers per unit of time that are picked up by the storage unit 31 itself. In this manner, in the aforesaid transit mode, if there is a certain quantity of containers stored on the storage unit 31, such quantity remains substantially unchanged over time.

In such situation, even if the quantity of containers remains unchanged over time, the storage unit 31, in a known manner, is managed according to an FIFO (first in first out) logic, and therefore the containers themselves are not always physically the same on the storage unit 31, but a continuous recirculation is present.

Alternatively, in the event in which there is no storage of containers on the storage unit 31, in the transit mode the containers themselves are not stored but rather simply transit along the storage unit 31.

According to an embodiment not represented in the enclosed figures, the bottling plant 1 comprises a heater, advantageously placed at the storage apparatus 3, which has the function of heating the containers that transit thereon.

For example, in the event in which the heating step occurs at low temperature, such as in the case of filling of bottles with sparkling wine, due to the difference of temperature between the external surface of the bottle and the surrounding environment, a condensation layer is created on the external surface itself, which results disadvantageous for the labeling step since it does not allow the label to correctly adhere to the bottle. In this case, the bottles are made to move through the aforesaid heater so as to bring them to a temperature close to ambient temperature, in a manner such to prevent the formation of the condensation layer and allow the labeling machine 16 to attach the label on the external surface of the bottles.

Advantageously, the aforesaid heater is placed along the second transport system 32, therefore upstream of the storage unit 31, or along the third transport system 33, therefore downstream of the storage unit 31.

Advantageously, the aforesaid heater coincides with the storage unit 31 itself or one portion thereof. In such situation, the storage unit 31 preferably comprises a heating system, which is susceptible of heating the containers placed on the storage unit 31 itself.

Preferably, the heating system for example comprises electrical heating elements placed below the storage unit 31, i.e. a device that generates a jet of hot air which hits the containers in order to heat them, i.e. with methods for heating containers that are well known to the man skilled in the art, which therefore are not described in detail. According to a further embodiment not represented in the enclosed figures, the heater is placed along the bottling line A immediately upstream of the labeling machine 16. In this manner, the containers are heated before the labeling step, independent of the operating mode with which the logic control unit 4 is selected.

Therefore with the expression "storage unit", it must be intended any one machine, such as for example a heater, provided with the possibility to store containers.

Advantageously, the plant 1 also comprises diagnostic systems 5 associated with at least the aforesaid upstream machine 13 and with the aforesaid downstream machine 15 in order to detect production stops thereof or in any case detect production variations.

With the expression "diagnostic systems" it must be intended that reference is made not only to systems aimed to detect malfunctions of the machines or of the first transport system 2 of the plant 1 but also to control systems automatically actuated by a PLC of the plant 1 (or of a machine of the line A) or even directly by the operator and that they account for automated operating logic, e.g. programmed on the PLC, or selections of the operator, by way of example in order to address slowing in one section of the bottling line A even in the absence of failures.

Such diagnostic systems 5 are well known to the man skilled in the art. By way of example they can regard a sensor that detects the explosion of a container on the support plates of the filler machine 12 or the liquid level in the same machine, or they can be a sensor that detects the presence of a container on a rotation gripper of the rinsing machine 11, i.e. a sensor that detects the breakage of the container or the correct position of the cap in the capping machine 13, i.e. a sensor that controls the depletion of the capsules in the cap-sealing machine 15 or of the labels in the labeling machine 16.

Of course, such diagnostic systems 5 will preferably be provided on all the operating machines 11-16 of the plant 1 in order to exploit the storage apparatus 3 for any one variation of the productivity of any one of the operating machines 11-16 which make up the plant 1. Advantageously, the aforesaid logic control unit 4 is connected to the diagnostic systems 5 described briefly above.

Advantageously, the diagnostic systems 5 detect the operations conditions of each single operating machine 11-16 that composes the plant 1 itself and of the first transport system 2, and send a corresponding signal to the logic control unit 4. The latter, on the basis of the control logic PLC of the plant 1, or even on the basis of an instruction imparted by an operator, is selectable in accordance with one of the operating modes described above.

For example, in case of a slow-down of the production on the downstream machine 15 with respect to the storage apparatus 3 (i.e. on at least one of the machines in the downstream section preferably corresponding to the dry section U of the plant 1) signaled to the logic control unit 4 by the diagnostic systems 5, the logic control unit 4 is selected according to the storage mode, so as to store containers on the storage unit 31 without slowing the productivity of the portion of the plant 1 upstream of the storage apparatus 3.

Alternatively, in the case of a slow-down of the production on the upstream machine 15 with respect to the storage apparatus 3 (i.e. on at least one of the machines in the upstream section preferably corresponding to the wet section of the plant 1) signaled to the logic control unit 4 by the diagnostic systems 5, the logic control unit 4 is selected according to the recovery mode, in which it allows using the containers previously stored on the storage unit 31 without slowing the productivity of the portion of the plant 1 downstream with respect to the storage apparatus 3.

In case of standard operations of all the operating machines 11-16, i.e. in the case of normal operation, the logic control unit 4 is selected to operate according to the by-pass mode or according to the transit mode, based on the needs of the production process and based on an instruction imparted by an operator.

With the expression slow-down of the production, it must be intended in the wide sense of the expression and not only to simple variation of production due to an automatic selection of a PLC of the plant 1 or to a direct selection of an operator, but rather also to a failure or to a malfunction in an operating machine 11-16 of the plant 1. For example, also in the absence of breakdowns in the strict sense of the term, it may be decided to make the two sections of the bottling line A work at different times, by storing or having stored in the storage apparatus 3 a quantity of partially processed containers.

Advantageously, the upstream conveyor 21 comprises at least one first screw 22, which is extended along a first rotation axis R1 between a first end portion and an opposite second end portion 22", which is placed at the release end 21" of the upstream conveyor 21. More in detail, the first screw 22 is susceptible of rotating around the first rotation axis R1 in order to move the containers along a first advancement direction A1 substantially parallel to the first rotation axis R1. In particular, the first screw 22, as is known, is provided with a first spiral channel, which is extended around the first rotation axis R1 and is provided with first spirals adapted to receive the containers in order to accompany them and distribute them along the upstream conveyor 21.

Advantageously, the first screw 22 is actuated to rotate around the first rotation axis R1 by the first motor system M1. In particular, the advancing speed of the containers along the first advancement direction A1 is directly proportional to the rotation speed of the first screw 22.

According to the embodiment represented in the enclosed figures, the first screw 22 is susceptible of feeding, with the containers picked up from the upstream conveyor 21, selectively the downstream conveyor 23 or the second transport system 32.

Advantageously, in the aforesaid by-pass mode, the first screw 21 feeds the downstream conveyor 23, while in all the other operating modes described above, it feeds the second transport system 32.

Preferably, the upstream conveyor 21 comprises a first conveyor belt, on which the containers rest and which is arranged for transporting them along the first advancement direction A1 at a speed synchronized with the rotation speed of the first screw 22, in a manner such that the containers advance along the first advancement direction A1 without dragging on the first conveyor belt.

Advantageously, the first conveyor belt is actuated by the first motor system M1.

Advantageously, the downstream conveyor 23 comprises at least one second screw 24, which is extended along a second rotation axis R2 between a third end portion 24', which is placed at the inlet end 23', and an opposite fourth end portion. More in detail, the second screw 24 is susceptible of rotating around the second rotation axis R2 in order to move the containers along a second advancement direction A2 substantially parallel to the second rotation axis R2. In particular, the second screw 24, as is known, is provided with a second spiral channel, which is extended around the second rotation axis R2 and is provided with second spirals adapted to receive the containers in order to accompany them and distribute them along the downstream conveyor 23.

Advantageously, the second screw 24 is actuated to rotate around the second rotation axis R2 by the second motor system M2. In particular, the advancing speed of the containers along the second advancement direction A2 is directly proportional to the rotation speed of the second screw 24.

According to the embodiment represented in the enclosed figures, the second screw 24 is susceptible of being fed with the containers selectively by the upstream conveyor 21 or by the third transport system 33.

Advantageously, in the aforesaid by-pass mode, the second screw 24 is fed by the upstream conveyor 21, advantageously by the first screw 22, while in all the other operating modes it is fed by the third transport system 33 with the containers coming from the storage unit 31.

Preferably, the downstream conveyor 23 comprises a second conveyor belt, on which the containers lie and which is arranged for transporting them along the second advancement direction A2 at a speed synchronized with the rotation speed of the second screw 24, such that the containers advance along the second advancement direction A2 without dragging on the second conveyor belt.

Advantageously, the second conveyor belt is actuated by the second motor system M2. Preferably, the first screw 22 and the second screw 24 are placed side-by-side with the second end portion 22" adjacent to the third end portion 24' and the first rotation axis R1 substantially parallel to the second rotation axis R2. Advantageously, the first and the second rotation axis R1, R2 coincide with each other.

In this manner, the aforesaid first advancement direction A1 is substantially parallel to the second advancement direction A2.

Advantageously, the first motor system M1 and the second motor system M2 are electric motors of brushless type. More in detail, the first motor system M1 commands the first screw 22, and in particular its rotation speed around the first rotation axis R1, and the first conveyor belt in order to control the advancing speed of the containers along the first advancement direction A1. In an entirely analogous manner, the second motor system M2 commands the second screw 24, and in particular its rotation speed around the second rotation axis R2, and the second conveyor belt in order to control the advancing speed of the containers along the second advancement direction A1.

Preferably, in the aforesaid by-pass mode, the logic control unit 4 commands the first motor system M1 and the second motor system M2 to rotate at the same rotation speed around the respective rotation axes R1, R2 respectively of first screw 22 and the second screw 24. In addition, the logic control unit 4 synchronizes the position of the screws 22, 24, in particular adjusting the phase thereof around the respective first and second rotation axes R1, R2, in a manner such that the first spirals of the first screw 22 coincide with the second spirals of the second screw 24, therefore allowing the passage of the containers between the first and the second screw 22, 24 themselves. In other words, in particular, the first spirals of the first screw 22 and the second spirals of the second screw 24 define a single spiral path having the same pitch, advantageously allowing the direct passage of the containers from the first screw 22 to the second screw 24.

Advantageously, in the by-pass mode, the second spiral channel of the second screw 24 is placed as a continuation of the first spiral channel of the first screw 22.

Preferably, the first transport system 2 comprises a common support element, on which the second end portion 22" of the first screw 22 and the third end portion 24' of the second screw 24 are rotatably connected around the respective first and second rotation axes R1, R2.

Advantageously, the second transport system 32 comprises a first star carrier 321, which is interposed between the upstream conveyor 21 and the storage unit 31. More in detail, the first star carrier 321 is placed to intercept the upstream conveyor 21 and is susceptible of picking up the containers from the upstream conveyor 21 itself, so as to transport them towards the storage unit 31.

Preferably, the first star carrier 321 is a star carrier with grippers, which is well known to the man skilled in the art and therefore will not be described in detail hereinbelow.

Advantageously, the second transport system 32 comprises, in addition, an inlet conveyor 322, which is interposed between the upstream conveyor 21 and the storage unit 31 and is susceptible of conveying the containers from the upstream conveyor 21 to the storage unit 31 themselves.

Preferably, the inlet conveyor 322 comprises a third conveyor belt 323, on which the containers rest which are moving from the upstream conveyor 21 to the storage unit 31.

According to the embodiment represented in the enclosed figures, the first star carrier 321 is interposed between the upstream conveyor 21 and the inlet conveyor 322, is placed to intercept the upstream conveyor 21, and in particular of the first screw 22, and of the inlet conveyor 322. More in detail, the first star carrier 321 is susceptible of picking up the containers from the upstream conveyor 21 and to feed with such containers the inlet conveyor 322. Preferably, the inlet conveyor 322 is interposed between the first star carrier 321 and the storage unit 31 and is susceptible of feeding the latter with the containers coming from the first star carrier 321.

Preferably, the logic control unit 4 commands the first star carrier 321, and in particular commands the actuation of its grippers, each of which intercepts a corresponding container moves along the upstream conveyor 21 and is susceptible of being closed around the container itself in order to grasp it, and to be opened in order to release it.

In particular, in the by-pass mode, the logic control unit 4 commands the grippers to remain open. In this manner, the grippers do not grasp the containers moving along the upstream conveyor 21, which continue along the first advancement direction A1 and directly feed the downstream conveyor 23. Alternatively, in the other operating modes described above, the logic control unit 4 commands each gripper of the first star carrier 321 to be closed when it intercepts a container at the upstream conveyor 21, such to pick it up, and be opened when the container itself is at the inlet conveyor 322. In this manner, the first star carrier 321 is commanded by the logic control unit 4 to transfer the containers from the upstream conveyor 21 to the inlet conveyor 322.

Advantageously, the second transport system 32 is actuated by a third motor system M3 at a third operative speed V3. In particular, the third operative speed V3 is synchronized with the first operative speed V1 of the upstream conveyor 21, in a manner such that the second transport system 32 transports a quantity of containers per unit of time substantially equal to that transported by the upstream conveyor 21 itself. More in detail, the rotation speed of the first star carrier 321 is such that the tangential speed of each gripper is substantially equal to the advancing speed of the containers along the upstream conveyor 21, in a manner such that the grippers of the first star carrier 321 are synchronized with the advancement of the containers along the first advancement direction A1 and are able to intercept them without bumping against them.

Advantageously, without departing from the protective scope of the present invention, in the by-pass mode or in the transit mode, the logic control unit 4 can command the grippers of the first star carrier 321 to pick up from the upstream conveyor 21 only one part of the containers in order to send them towards the storage unit 31, simultaneously transferring the other containers towards the downstream conveyor 23.

For example, in the by-pass mode, the first star carrier 321 is commanded by the logic control unit 4 to pick up from the upstream conveyor 21 the containers signaled as not compliant by the inspection machine 14, such to send such defective containers towards the storage unit 31, removing them from the bottling line A.

Advantageously, the third transport system 33 comprises an outlet conveyor 331, which is interposed between the storage unit 31 and the downstream conveyor 23 and is susceptible of conveying the containers from the storage unit 31 to the downstream conveyor 23.

Preferably, the outlet conveyor 331 comprises a fourth conveyor belt 334, on which the containers rest which are moving from the storage unit 31 towards the downstream conveyor 23.

Preferably, the outlet conveyor 331 comprises a third screw 335, which is extended along a third rotation axis R3 between a fifth end portion 335', which is directed towards the storage unit 31, and an opposite sixth end portion 335", which is directed towards the downstream conveyor 23. More in detail, the third screw 335 is susceptible of rotating around the third rotation axis R3 in order to move the containers along a third advancement direction A3 substantially parallel to the third rotation axis R3.

In particular, the third screw 335, as is known, is provided with a third spiral channel, which is extended around the third rotation axis R3 and is provided with third spirals adapted to receive the containers in order to accompany them and distribute them along the outlet conveyor 331.

Advantageously, the third transport system 33 comprises a second star carrier 332, which is interposed between the storage unit 31 and the downstream conveyor 23, is placed to intercept the latter and is susceptible of picking up the containers from the storage unit 31 in order to transport them towards the downstream conveyor 23 itself. Preferably, the second star carrier 332 is a star carrier with gripper, which is well known to the man skilled in the art and therefore will not be described in a detailed manner hereinbelow.

Preferably, the outlet conveyor 331 is interposed between the storage unit 31 and the second star carrier 332 and is susceptible of feeding the latter with the containers coming from the storage unit 31. In addition, the second star carrier 332 is interposed between the outlet conveyor 331 and the downstream conveyor 23, is placed to intercept the latter and the outlet conveyor 331. In particular, the second star carrier 332 is susceptible of picking up the containers from the outlet conveyor 331 and to feed the downstream conveyor 23 with such containers.

Preferably, the logic control unit 4 commands the second star carrier 332, and in particular commands the actuation of its grippers, each of which intercepting a corresponding container moving along the outlet conveyor 331 and susceptible of being closed around the container itself in order to grasp it, and be opened in order to release it.

Advantageously, the third transport system 33 is actuated by a fourth motor system M4 at a fourth operative speed V4. In particular, the third fourth operative speed V4 is synchronized with the second operative speed V2 of the downstream conveyor 23, in a manner such that the third transport system 33 transports a quantity of containers per unit of time substantially equal to that transported by the downstream conveyor 23 itself.

More in detail, the rotation speed of the second star carrier 331 is such that the tangential speed of each gripper thereof is substantially equal to the advancing speed of the containers along the outlet conveyor 331 in a manner such that the grippers of the second star carrier 332 are synchronized with the advancement of the containers along the third advancement direction A3 and are able to intercept them without bumping against them.

According to the embodiment represented in the enclosed figures, the third transport system 33 comprises a third star carrier 333, which is interposed between the second star carrier 332 and the downstream conveyor 23 and is placed to intercept these two. More in detail, the third star carrier 333 is susceptible of picking up the containers from the second star carrier 332 and to feed the downstream conveyor 23 with such containers.

Preferably, the third 333 is a star carrier with gripper, which is well known to the man skilled in the art and therefore will not be described in a detailed manner hereinbelow. Preferably, the logic control unit 4 commands the third star carrier 333, and in particular commands the actuation of its grippers, each of which intercepting a corresponding container on the second star carrier 332 and susceptible of being closed around the container itself in order to grasp it, and of being opened in order to release it.

Advantageously, the third star carrier 333 is actuated by fourth motor system M4 with a rotation speed such that the tangential speed of each gripper thereof is substantially equal to the tangential speed of the grippers of the second star carrier 332, in a manner such that the grippers of the third star carrier 333 are synchronized with the rotation of the grippers of the second star carrier 332 and are able to intercept them without bumping against them.

In addition, the rotation speed such that the tangential speed of each gripper thereof e synchronized with the second operative speed V2 of the downstream conveyor 23, in a manner such that the tangential speed of each gripper thereof is equal to the advancing speed of the containers along the second advancement direction A2. In this manner, the grippers of the third star carrier 333 are opened when the container that they transport is placed at the downstream conveyor 23, and in particular in a corresponding spiral of the second screw 24

Also forming the object of the present invention is a method for operating a plant 1 for bottling containers with liquids of the above-described type, regarding which the numeric references will be maintained for the sake of improved descriptive clarity.

The method provides that the logic control unit 4 is selectable according to the operation of the operating machines 11-16 of the plant 1.

More in detail, in case of normal operation of the operating machines 11-16, the logic control unit 4 is selected to operate in the by-pass mode.

In the case of slow-down of the production of at least one of the operating machines 11-16 downstream of the storage apparatus 3, the logic control unit 4 is selected to operate in the storage mode for storing containers on the storage unit.

In the case of slow-down of the production of at least one of the operating machines 11-16 upstream of the storage apparatus 3, the logic control unit 4 is selected to operate in the recovery mode in order to feed the operating machines 11-16 downstream of the storage apparatus 3 with containers coming from the storage unit 31 that were previously stored.

Advantageously with the bottling plant 1 and the method, object of the present invention, it is possible to store or recover containers from the storage unit 31 without necessarily stopping the production upstream or downstream of the storage apparatus 3, which translates into a considerable increase of the overall production efficiency of the plant 1.

By slow-down of the production, a breakdown can be intended, which can also lead to the complete interruption of the production of an operating machine 11-16, such as for example a jamming of the capsules at the cap-sealing machine 15. Alternatively, by slow-down of the production it can also be intended a reduction of the frequency of the production set to one or more operating machines 11-16 of the plant 1 based on a PLC command or an operator due for example to operating needs to or to maintenance of the plant 1.

For example, it is possible to carry out a size change (or in an equivalent manner a change of the liquid to be bottled) of the plant 1 without completely interrupting the production of the plant 1 itself.

More in detail, in order to carry out the size change, e.g. in order to pass to the filling of containers with different dimensions, with the plant 1, object of the present invention, it is possible to operate as follows.

The size change operation initially provides for a storage step in which the logic control unit 4 is selected according to the storage mode, in a manner such to store containers on the storage unit 31. In particular, in such storage step, both the upstream part and the downstream part of the plant 1 with respect to the storage apparatus 3 are operative, with the first operative speed V1 of the upstream conveyor 21 greater than the second operative speed V2 of the downstream conveyor 23. In this manner, the number of bottles per unit of time that enter into the storage unit 31 is greater than the number of bottles per unit of time that are picked up from the storage unit 31, and therefore a storage is created for containers that can be used as a buffer in subsequent steps.

When on the storage unit 31 a predetermined number of containers has been stored, the size change operation provides for a first substitution step, in which the operating machines 11-16 placed in the portion of the plant 1 upstream of the storage apparatus 3 are stopped, in a manner such to proceed with the size change of the latter. In this first substitution step, in particular, the operating machines 11-16 of the plant 1 placed in the portion of the plant 1 downstream of the storage apparatus 3 remain operative, and are fed with the containers coming from the storage unit 31 stored in the storage step.

At the end of the first substitution step, the size change operation provides for a second substitution step, in which the operating machines 11-16 placed in the portion of the plant 1 upstream of the storage apparatus 3 are started, in a manner such to restore the production thereof, and substantially simultaneously the operating machines 11-16 of the plant 1 placed in the portion of the plant 1 downstream of the storage apparatus 3 are stopped, in a manner such to proceed with the size change of the latter. In such second substitution step, the logic control unit 4 is selected to operate according to the storage mode, in which, in particular, it commands the second motor system M2 of the downstream conveyor 23 with the second operative speed V2 equal to zero, since it is not necessary to feed with containers the machines placed downstream of the storage apparatus 3.

At the end of the second substitution step, the size change operation provides for a recovery step in which the operating machines 11-16 downstream of the storage apparatus 3 are restarted, and simultaneously the logic control unit 4 is selected to operate according to the recovery mode. In particular, in such recovery step, both the part upstream and the part downstream of the plant 1 with respect to the storage apparatus 3 are operative, with the first operative speed V1 of the upstream conveyor 21 lower than the second operative speed V2 of the downstream conveyor 23. In this manner, the number of bottles per unit of time that enter into the storage unit 31 is smaller than the number of bottles per unit of time that are picked up from the storage unit 31, and therefore the storage of containers that was created in the storage step is reduced.

When all the storage of containers on the storage unit 31 has been recovered, the logic control unit 4 is selected to operate according to the by-pass mode, so as to restore the regular operations of the bottling plant 1.

In this manner, it is possible to carry out the size change of the plant 1 itself, avoiding the stoppage of all the operating machines 11-16 simultaneously, which involves a considerable increase of the production efficiency of the plant 1 and a reduction of the stoppage times of the plant 1 itself which is translated into a reduction of the overall operating costs.

The invention thus conceived therefore attains the pre-established objects.

The contents of the Italian patent application number 102022000021231, from which this application claims priority, are incorporated herein by reference.

The invention claimed is:

1. A plant for bottling containers with liquids, said plant comprising:
   a plurality of operating machines one after the other along a bottling line;
   a first transport system adapted to make containers move along said bottling line from an inlet section of the plant to an outlet section of the plant through said plurality of machines;
   a storage apparatus for storing a plurality of containers, wherein the storage apparatus is associated with a section of said bottling line, wherein the storage apparatus is interposed at least between an upstream machine and a downstream machine of said plurality of machines, and wherein the storage apparatus comprises:
      a storage unit for storing containers;
      a second transport system, which is susceptible of extracting said containers from said first transport system of said bottling line in order to feed said storage unit;
      a third transport system, which is susceptible of picking up the containers stored on said storage unit in order to feed said first transport system of said bottling line;
   wherein said first transport system comprises an upstream conveyor actuated by a first motor system at a first operative speed, and a downstream conveyor, actuated by a second motor system at a second operative speed;
   wherein a release end of said upstream conveyor is side-by-side an inlet end of said downstream conveyor in order to transfer the containers from said upstream conveyor to said downstream conveyor;
   wherein the release end of said upstream conveyor is adjacent to the inlet end of said downstream conveyor, wherein said downstream conveyor extends as a continuation of said upstream conveyor;
   wherein said bottling plant comprises a logic control unit connected to the first and second motor systems of the respective upstream conveyor and downstream conveyor of said first transport system, to said second transport system and to said third transport system;
   wherein said logic control unit is programmed in accordance with at least the following operative modes;
   a by-pass mode, in which said logic control unit commands said first motor system and said second motor system with equivalent first and second operative speeds and in which the containers transit from the release end of the upstream conveyor to the inlet end of the downstream conveyor in order to continue along said bottling line;
   wherein, when said logic control unit is configured to operate according to said by-pass mode, the containers transit directly from said upstream conveyor to said downstream conveyor;
   a storage mode, in which said logic control unit commands said first motor system and said second motor system respectively with said first operative speed greater than said second operative speed and in which said logic control unit commands said second transport system to extract the containers from said first transport system in order to feed said storage unit;
   a recovery mode, in which said logic control unit commands said first motor system and said second motor system respectively with said first operative speed lower than said second operative speed, and in which said logic control unit commands said third transport system to pick up the containers stored on said storage unit in order to feed said downstream conveyor.

2. The plant of claim 1, wherein said logic control unit is programmed in accordance with a transit mode, in which said logic control unit commands said first motor system and said second motor system with equivalent first and second operative speeds, in which said logic control unit commands said second transport system to extract the containers from the upstream conveyor in order to feed said storage unit, and in which said logic control unit commands said third transport system to pick up the containers stored on said storage unit in order to feed said downstream conveyor.

3. The plant of claim 1, wherein said upstream conveyor comprises a first screw, which is extended along a first rotation axis between a first end portion and an opposite second end portion, said second end portion being placed at said release end, and wherein said first screw is susceptible of rotating around said first rotation axis in order to move the containers along a first advancement direction substantially parallel to said first rotation axis;
   wherein said first screw is susceptible of selectively feeding the containers to said downstream conveyor or said second transport system.

4. The plant of claim 3, wherein said downstream conveyor comprises a second screw, which is extended along a second rotation axis between a third end portion, said third end portion being placed at said inlet end, and an opposite fourth end portion,
   wherein said second screw is susceptible of rotating around said second rotation axis in order to move the containers along a second advancement direction substantially parallel to said second rotation axis;
   wherein said second screw is susceptible of selectively receiving containers from said upstream conveyor or from said third transport system;
   wherein said first screw and said second screw are placed side-by-side with said second end portion adjacent to said third end portion, and
   wherein said first rotation axis is substantially parallel to said second rotation axis.

5. The plant of claim 1, wherein said downstream conveyor comprises a second screw, which is extended along a second rotation axis between a third end portion, said third end portion being placed at said inlet end, and an opposite fourth end portion,
   wherein said second screw is susceptible of rotating around said second rotation axis in order to move the containers along a second advancement direction substantially parallel to said second rotation axis;
   wherein said second screw is susceptible of selectively receiving containers from said upstream conveyor or from said third transport system.

6. The plant of claim 1, wherein said second transport system comprises a first star carrier, which is interposed between said upstream conveyor and said storage unit, wherein said first star carrier is placed to intercept said upstream conveyor, and wherein said first star carrier is susceptible of picking up the containers from said upstream conveyor in order to transport them towards said storage unit.

7. The plant of claim 1, wherein said second transport system comprises an inlet conveyor, which is interposed between said upstream conveyor and said storage unit, and wherein said inlet conveyor is susceptible of conveying the containers from said upstream conveyor to said storage unit.

8. The plant of claim 6, wherein said second transport system comprises an inlet conveyor, which is interposed between said upstream conveyor and said storage unit, and wherein said inlet conveyor is susceptible of conveying the containers from said upstream conveyor to said storage unit;
wherein said first star carrier is interposed between said upstream conveyor and said inlet conveyor, wherein said first star carrier is placed to intercept said upstream conveyor and said inlet conveyor, and wherein said first star carrier is susceptible of picking up the containers from said upstream conveyor and of feeding said inlet conveyor with the containers;
wherein said inlet conveyor is interposed between said first star carrier and said storage unit, and wherein said inlet conveyor is susceptible of feeding said storage unit with the containers coming from said first star carrier.

9. The plant of claim 1, wherein said third transport system comprises an outlet conveyor, which is interposed between said storage unit and said downstream conveyor, and wherein said outlet conveyor is susceptible of transporting the containers from said storage unit to said downstream conveyor.

10. The plant of claim 9, wherein said outlet conveyor comprises a third screw, which is extended along a third rotation axis between a fifth end portion, which is directed towards said storage unit, and an opposite sixth portion, which is directed towards said downstream conveyor, and wherein said third screw is susceptible of rotating around said third rotation axis in order to move the containers along a third advancement direction substantially parallel to said third rotation axis.

11. The plant of claim 10, wherein said third transport system comprises a second star carrier, which is interposed between said storage unit and said downstream conveyor, wherein said second star carrier is placed to intercept said downstream conveyor, and wherein said second star carrier is susceptible of picking up the containers from said storage unit in order to transport the containers towards said downstream conveyor;
wherein said outlet conveyor is interposed between said storage unit and said second star carrier and wherein said outlet conveyor is susceptible of feeding said second star carrier with the containers coming from said storage unit;
wherein said second star carrier is interposed between said outlet conveyor and said downstream conveyor, wherein said second star carrier is placed to intercept said outlet conveyor and said downstream conveyor, and wherein said second star carrier is susceptible of picking up the containers from said outlet conveyor and of feeding said downstream conveyor with the containers.

12. The plant of claim 1, wherein said third transport system comprises a second star carrier, which is interposed between said storage unit and said downstream conveyor, wherein said second star carrier is placed to intercept said downstream conveyor, and wherein said second star carrier is susceptible of picking up the containers from said storage unit in order to transport the containers towards said downstream conveyor.

* * * * *